(12) United States Patent
Das et al.

(10) Patent No.: US 9,652,884 B2
(45) Date of Patent: May 16, 2017

(54) SYSTEM AND METHOD FOR GENERATING A REFERENCE PLANE OF A HEAD

(71) Applicant: General Electric Company, Schenectady, NY (US)

(72) Inventors: Bipul Das, Bangalore (IN); Uday Damodar Patil, Bangalore (IN); Ajay Narayanan, Bangalore (IN); Naga Venkata Kartheek Medathati, Sathupally (IN); Harshit Sureka, Madhya Pradesh (IN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/961,447

(22) Filed: Dec. 7, 2015

(65) Prior Publication Data

US 2016/0171685 A1 Jun. 16, 2016

(30) Foreign Application Priority Data

Dec. 10, 2014 (IN) ............................ 6234/CHE/2014

(51) Int. Cl.
*G06K 9/00* (2006.01)
*G06T 15/08* (2011.01)
*G06T 7/11* (2017.01)

(52) U.S. Cl.
CPC .............. *G06T 15/08* (2013.01); *G06T 7/11* (2017.01); *G06T 2207/10081* (2013.01); *G06T 2207/20164* (2013.01); *G06T 2207/30008* (2013.01)

(58) Field of Classification Search
None
See application file for complete search history.

(56) References Cited

U.S. PATENT DOCUMENTS

| 5,278,756 A * | 1/1994 | Lemchen | A61C 19/04 128/920 |
| 7,747,305 B2 | 6/2010 | Dean et al. | |
| 2009/0128553 A1* | 5/2009 | Perry | G06T 19/00 345/419 |
| 2011/0244415 A1* | 10/2011 | Batesole | A61C 7/00 433/24 |
| 2013/0243151 A1 | 9/2013 | Shih | |

(Continued)

FOREIGN PATENT DOCUMENTS

| CN | 201328821 Y | 10/2009 |
| WO | 2014008369 A1 | 1/2014 |
| WO | 2014080083 A1 | 5/2014 |

OTHER PUBLICATIONS

Lee et al., Three-dimensional prediction of the nose for facial reconstruction using cone-beam computed tomography, Jan. 11, 2014, 194.e1-194.e5.*

(Continued)

*Primary Examiner* — Jason Heidemann

(57) ABSTRACT

A method includes receiving a Computed Tomography (CT) image comprising a head of a subject from a CT scanner and detecting a first and a second petrous bone of the head in the CT image. The method further includes determining a nasion of the head in the CT image based on the first and the second petrous bone. The method also includes generating a reference plane of the head based on the nasion and the first and the second petrous bone.

12 Claims, 5 Drawing Sheets

(56) References Cited

U.S. PATENT DOCUMENTS

2014/0100485 A1    4/2014  Linguraru et al.
2014/0348405 A1*  11/2014  Chen .................... G06T 7/0046
                                                            382/131

OTHER PUBLICATIONS

Cevidanes, Head Orientation in CBCT-generated Cephalograms, Angle Orthod. Sep. 2009 ; 79(5): 971-977.*

Yang J et al.,"Cephalometric image analysis and measurement for orthognathic surgery.", Med Biol Eng Comput, vol. 39, Issue 3,pp. 279-284, 2001.

Mancas et al., "Automatic Fast Detection of Tumor Suspect Areas on CT Scan.", In proceeding of: 15th IEEE Visualization 2004 Conference (VIS 2004),2004.

Marcus et al., "Objective Three-Dimensional Analysis of Cranial Morphology",Eplasty, 2008.

Cheng et al., "Automatic identification of Frankfurt plane and mid-sagittal plane of skull", Applications of Computer Vision (WACV), 2012 IEEE Workshop on, pp. 233-238, Jan. 2012.

* cited by examiner

SYSTEM AND METHOD FOR GENERATING A REFERENCE PLANE OF A HEAD

BACKGROUND

The technology disclosed herein generally relates to Computed Tomography (CT) imaging systems. More specifically, the subject matter relates to systems and methods to generate a reference plane of a head in a CT image.

CT is a technology that uses X-rays to produce tomographic images (i.e., virtual slices) of a subject (e.g., a head/head-neck region of a human patient). The tomographic slices are then used to generate a three-dimensional (3D) CT image of the head/head-neck region. Such CT images are used extensively for diagnostic and therapeutic applications in various medical disciplines. A reference plane, defined by three or more anatomical landmarks of the head, serves as a platform capable of facilitating such diagnostic and therapeutic applications which require semantic knowledge about any anatomical structure or individual voxel within the CT image. The reference plane enables, for example, a radiologist, a clinician, and the like, to diagnose a subject by encoding information about an anatomical structure at any location in the CT image based on prior knowledge about the location with reference to the reference plane. Current methods for generating reference planes identify the anatomical landmarks based on, for example, local statistical features, active shape models, 3D parametric intensity models, and the like. Such methods cause numerous errors as they fail to account for variations caused by different subjects, different types of CT scanners, asymmetric positioning of the subject in a CT scanner, and the like.

Thus, there is a need for an enhanced system and method for generating a reference plane of head in a CT image.

BRIEF DESCRIPTION

In accordance with one aspect of the present technique, a method includes receiving a Computed Tomography (CT) image comprising a head of a subject from a CT scanner and detecting a first and a second petrous bone of the head in the CT image. The method further includes determining a nasion of the head in the CT image based on the first and the second petrous bone. The method also includes generating a reference plane of the head based on the nasion and the first and the second petrous bone.

In accordance with one aspect of the present system, a system includes a petrous detector configured to receive a CT image comprising a head of a subject from a CT scanner and detect a first and a second petrous bone of the head in the CT image. The system further includes a nasion detector configured to determine a nasion of the head based on the first and the second petrous bone. The system also includes a plane unit configured to generate a reference plane of the head based on the nasion and the first and the second petrous bone.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
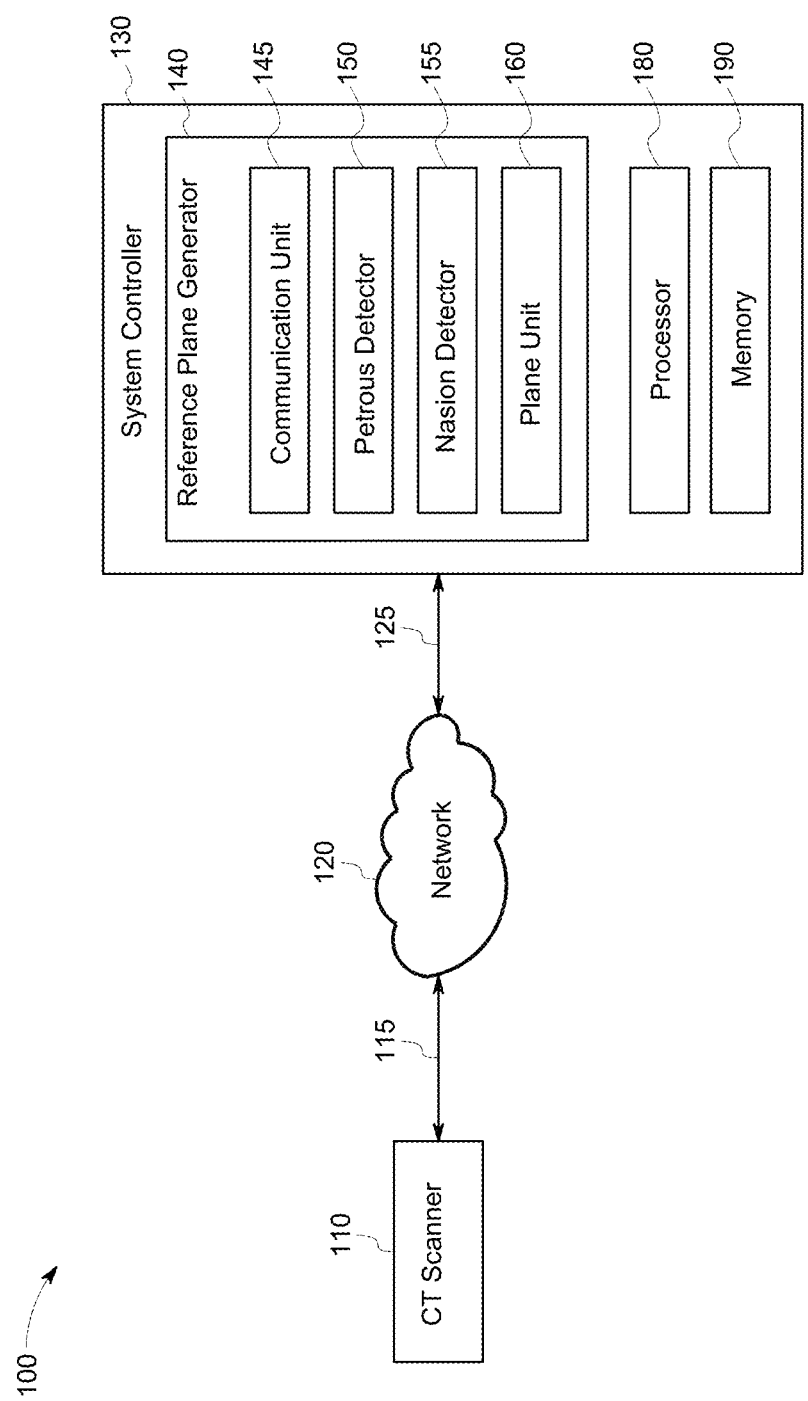
FIG. 1 is a block diagram illustrating a system for generating a reference plane of a head in Computed Tomography (CT) image according to one embodiment.

A system and method for generating a reference plane of a head in a Computed Tomography (CT) image is described herein. FIG. 1 illustrates a block diagram of a system 100 configured to generate a reference plane of a head in a CT image according to one embodiment. The system 100 includes a CT scanner 110 and a system controller 130 that are communicatively coupled via a network 120. Although the CT scanner 110 and the system controller 130 are communicatively coupled via the network 120 according to FIG. 1, the system controller 130 may be included within the CT scanner 110.

The network 120 may be a wired or wireless type, and may have any number of configurations such as a star configuration, a token ring configuration, or other known configurations. Furthermore, the network 120 may include a local area network (LAN), a wide area network (WAN) (e.g., the internet), and/or any other interconnected data path across which multiple devices may communicate. In one embodiment, the network 120 may be a peer-to-peer network. The network 120 may also be coupled to or include portions of a telecommunication network for sending data in a variety of different communication protocols. In one embodiment, the network 120 may include Bluetooth communication networks or a cellular communications network for sending and receiving data such as via a short messaging service (SMS), a multimedia messaging service (MMS), a hypertext transfer protocol (HTTP), a direct data connection, a wireless application protocol (WAP), an email, or the like. While only one network 120 is shown coupled to the CT scanner 110 and the system controller 130, multiple networks 120 may be coupled to the entities.

The CT scanner 110 may be any type of scanner that is configured to project one or more X-ray beams towards a subject (e.g., a human patient) and generate one or more three-dimensional (3D) CT images of the subject by receiving and processing the one or more X-ray beams that have passed through the subject. The CT scanner 110 may include, for example, an axial mode scanner, a helical mode scanner, a single-slice scanner, a multi-slice scanner, a single-energy scanner, a multi-energy scanner, and the like. In one embodiment, the CT scanner 110 generates one or more CT images comprising the head or the head/neck region of a human. The CT scanner 110 is further configured to send the one or more CT images to the system controller 130 via the network 120. The CT scanner 110 is communicatively coupled to the network 120 via a signal line 115. The signal line 115 is provided for illustrative purposes and represents the CT scanner 110 that is configured to communicate in a wired or a wireless fashion over the network 120.

The system controller 130 may be any type of device configured to receive one or more CT images comprising a head of a human and generate a reference plane of the head. The reference plane is a two-dimensional co-ordinate reference plane that is defined by three or more anatomical landmarks in the head of a human subject. The reference plane provides a platform for acquiring semantic knowledge about any anatomical structure or voxel at any location within the received CT image. In one embodiment, the system controller 130 generates a Montague's reference plane that is defined by a left porion, a right porion, and a nasion (i.e., three anatomical landmarks) of the head. The system controller 130 may be further configured to control the operation of the CT scanner 110, for example, control the dosage of the (e.g., a peak kilovoltage, a milliampere seconds, a time duration) of the X-rays projected onto the human, reconstruction of the CT image, and the like. The system controller 130 is communicatively coupled to the network 120 via signal line 125. The signal line 125 is provided for illustrative purposes and represents the system controller 130 communicating by wires or wirelessly over the network 120. Although one system controller 130 is shown in FIG. 1, a plurality of system controllers 130 may be coupled to the network 120. Additionally, although the system controller 130 is communicatively coupled to the CT scanner 110 via the network 120, in some embodiments the processing of the system controller 130 may be performed within the CT scanner 110.

In the illustrated system 100, the system controller 130 includes a reference plane generator 140, a processor 180, and a memory 190. The reference plane generator 140 includes a communication unit 145, a petrous detector 150, a nasion detector 155, and a plane unit 160. The one or more sub-units of the reference plane generator 140, the processor 180, and the memory 190 may be coupled to a bus (not shown) for communication with each other. The one or more sub-units of the reference plane generator 140 include codes and routines that may be implemented as software, hardware, or a combination of software and hardware.

The processor 180 may include at least one arithmetic logic unit, microprocessor, a general purpose controller or other processor arrays to perform computations, and/or retrieve data stored in the memory 190. In one embodiment, the processor 180 may be a multiple core processor. The processor 180 processes data signals and may include various computing architectures including a complex instruction set computer (CISC) architecture, a reduced instruction set computer (RISC) architecture, or an architecture implementing a combination of instruction sets. In one embodiment, the processing capability of the processor 180 may be limited to supporting the retrieval of data and transmission of data. In another embodiment, the processing capability of the processor 180 may also perform more complex tasks, including various types of feature extraction, modulating, encoding, multiplexing, and the like. Other type of processors, operating systems, and physical configurations are also envisioned.

The memory 190 may be a non-transitory storage medium. For example, the memory 190 may be a dynamic random access memory (DRAM) device, a static random access memory (SRAM) device, a flash memory or other memory devices. The memory 190 may also include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices.

The memory 190 stores data that is required for the reference plane generator 140 to perform associated functions. In one embodiment, the memory 190 stores the sub-units (e.g., the communication unit 145, the nasion detector 155, and the like) of the reference plane generator 140. In another embodiment, the memory 190 stores a petrous threshold value that is defined by, for example, an operator of the system controller 130. The petrous threshold value is described in further detail with reference to the petrous detector 150.

The communication unit 145 includes codes and routines configured to handle communications between the CT scanner 110 and the sub-units of the reference plane generator 140. In one embodiment, the communication unit 145 includes a set of instructions executable by the processor 180 to provide the functionality for handling communications between the CT scanner 110 and the sub-units of the reference plane generator 140. In another embodiment, the communication unit 145 is stored in the memory 190 and is accessible and executable by the processor 180. In either embodiment, the communication unit 145 is adapted for communication and cooperation with the processor 180 and other sub-units of the reference plane generator 140.

In one embodiment, the communication unit 145 receives a CT image comprising a head or a head/neck region of a human from the CT scanner 110. In such an embodiment, the communication unit 145 sends the received CT image to the petrous detector 150 and the nasion detector 155. In another embodiment, the communication unit 145 receives a reference plane of a head in a CT image from the plane unit 160. In such an embodiment, the communication unit 145 sends the reference plane to, for example, a display device (not shown), an operator of the system controller 130, and the like.

The petrous detector 150 includes codes and routines configured to determine a first and a second petrous bone of a head in the CT image. In one embodiment, the petrous detector 150 includes a set of instructions executable by the processor 180 to provide the functionality for determining a first and a second petrous bone of the head in the CT image. In another embodiment, the petrous detector 150 is stored in the memory 190 and is accessible and executable by the processor 180. In either embodiment, the petrous detector 150 is adapted for communication and cooperation with the processor 180 and other sub-units of the reference plane generator 140.

The petrous detector 150 receives the CT image comprising a head of a subject from the communication unit 145. In one embodiment, the petrous detector 150 determines whether the attenuation value of each voxel in the CT image exceeds a petrous threshold value. The petrous threshold value is defined by, for example, an operator of the system controller 130 based on attenuation values corresponding to petrous bones in previously generated clinical data. The petrous detector 150 detects one or more voxels in the CT image as the first the second petrous bones of the head in response to determining that the attenuation values of the one or more voxels exceed the petrous threshold value. For example, the petrous detector 150 labels/classifies two voxels with attenuation values 0.8 and 0.82 units as a petrous bone, since they exceed the petrous threshold value of 0.75 units. In such an example, the petrous detector 150 fails to label a voxel with an attenuation value of 0.5 units as it is lesser than the petrous threshold value of 0.75 units.

In a further embodiment, the petrous detector 150 determines the first and second petrous bones in the CT image based on the positional information (e.g., x, y, and z coordinates) of the one or more voxels in the CT image. This is advantageous as the petrous detector 150 avoids classifying voxels that are located, for example, near the neck or mouth regions in the CT image as a petrous bone. In the above example, the received CT image includes a voxel with an attenuation value of 0.78 units that corresponds to a dental implant of the subject. Although, the attenuation value of the voxel exceeds the petrous threshold value, the petrous detector 150 fails to classify it as a petrous bone as the positional information of the voxels (e.g., x-y location of the voxels) indicates that the voxel represents the mouth region of the head.

The petrous detector 150 is further configured to map a first and a second ellipsoid corresponding to a first and a second petrous bone based on one or more segmentation algorithms. The petrous detector 150 then estimates one or more directional vectors of the head in the CT image by performing principal component analysis of the first and the second ellipsoids. The one or more directional vectors include an anterior direction vector, a posterior direction vector, and a superior direction vector that indicate an overall pose of the head in the CT image. In one embodiment, the first and the second ellipsoids converge towards the anterior side of the head and are elongated towards superior side of the head. The petrous detector 150 is also configured to send the locations of the first and the second petrous bones and the one or more directional vectors to the nasion detector 155 and the plane unit 160.

Figure 2:
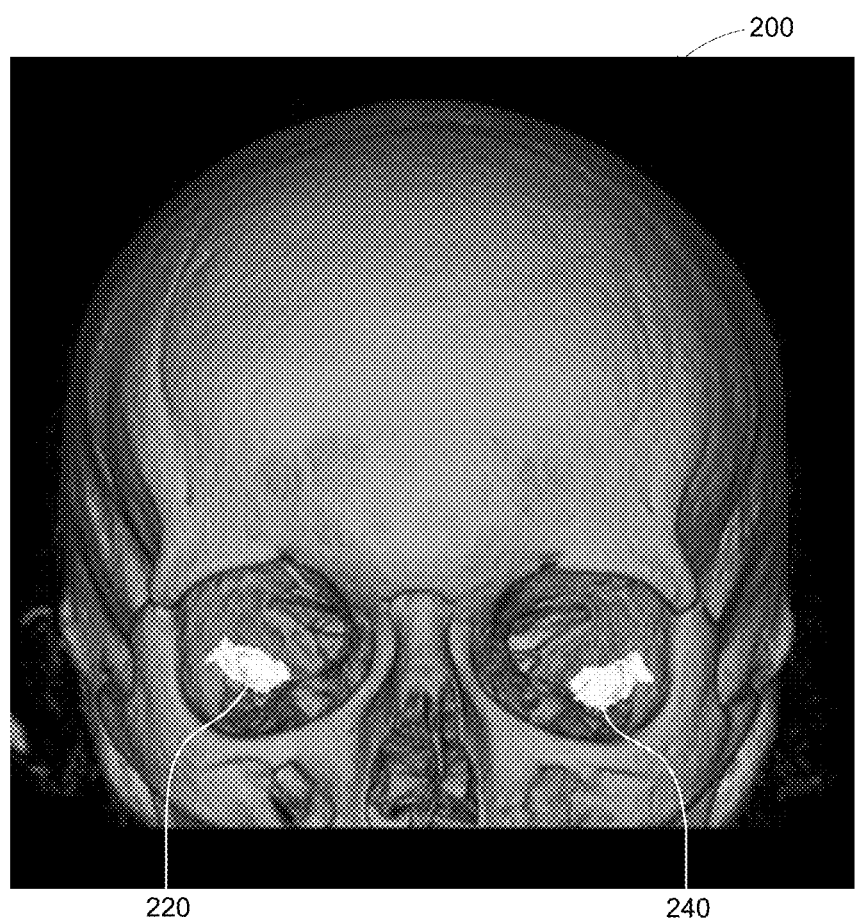
FIG. 2 is a CT image including a first and a second petrous bone of a head according to one embodiment.

Referring now to FIG. 2, a CT image 200 including a head of a subject is illustrated according to one embodiment. The CT image 200 illustrates the first and the petrous bone 220 and 240 that are segmented using a first and a second ellipsoid by the petrous detector.

Referring back to FIG. 1, a nasion detector 155 includes codes and routines configured to determine a nasion of a head in the CT image. The nasion is a depression at the root of the nose that indicates a junction of the intranasal structures and the frontonasal structures of the head. In one embodiment, the nasion detector 155 includes a set of instructions executable by the processor 180 to provide the functionality for determining a nasion of a head in the CT image. In another embodiment, the nasion detector 155 is stored in the memory 190 and is accessible and executable by the processor 180. In either embodiment, the nasion detector 155 is adapted for communication and cooperation with the processor 180 and other sub-units of the reference plane generator 140.

The nasion detector 155 receives the CT image from the communication unit 145. The nasion detector 155 also receives the locations of the first and the second petrous bones and the one or more directional vectors from the petrous detector 150. The nasion detector 155 is configured to determine the nasion of the head in the CT image by identifying a mid-saggital plane of the head based on the first and the second petrous bone and the one or more directional vectors. The nasion is represented by one or more voxels that lie on the mid-sagittal plane of the head. In one embodiment, the nasion detector 155 estimates a plurality of saggital planes of the head based on the equations:

$$S_i = (P_C + iD_D) + aD_s + bD_A;  \quad (1) \text{ and}$$

$$i \in (-w, w) \quad (2)$$

Where, PC is a petrous bone centroid calculated by the nasion detector 155 based on the locations of the first and the second petrous bones; DS is the superior direction vector; DA is the anterior direction vector; DD is the dominant vector of the head calculated by the nasion detector 155 based on the one or more direction vectors; w is a search width around the petrous bone centroid and is defined by, for example, an operator of the system controller 130; Si represents the plurality of saggital planes of the head; and a and b are positive real numbers that are defined by, for example, an operator of the system controller 130.

The nasion detector 155 calculates a bone voxel count (i.e., a number of voxels representing bone) for each estimated saggital plane (Si). The nasion detector 155 identifies the saggital plane with the highest bone voxel count as the mid-saggital plane ($S_M$) of the head. The nasion detector 155 then determines the nasion by determining a first point of depression on the surface of the head based on the petrous bone centroid and the mid-saggital plane. The first point of the depression is a voxel representing a point on the surface of the head along the mid-saggital plane and is of the least distance from the petrous bone centroid. In one embodiment, the nasion detector 155 determines the first point of depression by searching along the surface of the head from the superior direction towards the anterior direction based on the equations:

$$R_\theta = \text{dist}\{O_M, E_\theta\}; \tag{3}$$

$$\theta \in (0, 90) \text{degrees}; \tag{4}$$ and $$N = E_{\text{argmin} R_\theta} \tag{5}$$

Where, R is the euclidean distance profile for each $\theta$; $O_M$ is a voxel representing the petrous bone centroid on the mid-saggital plane; $E_\theta$ represents a point on the surface of the head for each $\theta$; and N is the location of the nasion (i.e., the point of first depression).

In a further embodiment, the nasion detector 155 determines the nasion based on the above described equations (3)-(5) and other anatomical structures (e.g., eye sockets) of the head in the received CT image. In such an embodiment, the nasion detector 155 determines the locations of the eye sockets in the received CT image based on, for example, segmentation algorithms. In one example, the naison detector 155 segments the eye sockets based on the attenuation values in the received CT image, since the attenuation values of the regions corresponding to the eye sockets will be lower corresponding to the attenuation values of the bony regions in the head. The nasion detector 155 then determines the location of the nasion based on the above equations (3)-(5) and for example, a mid-point of a line connecting the mid-points of the eye sockets.

Figure 3:
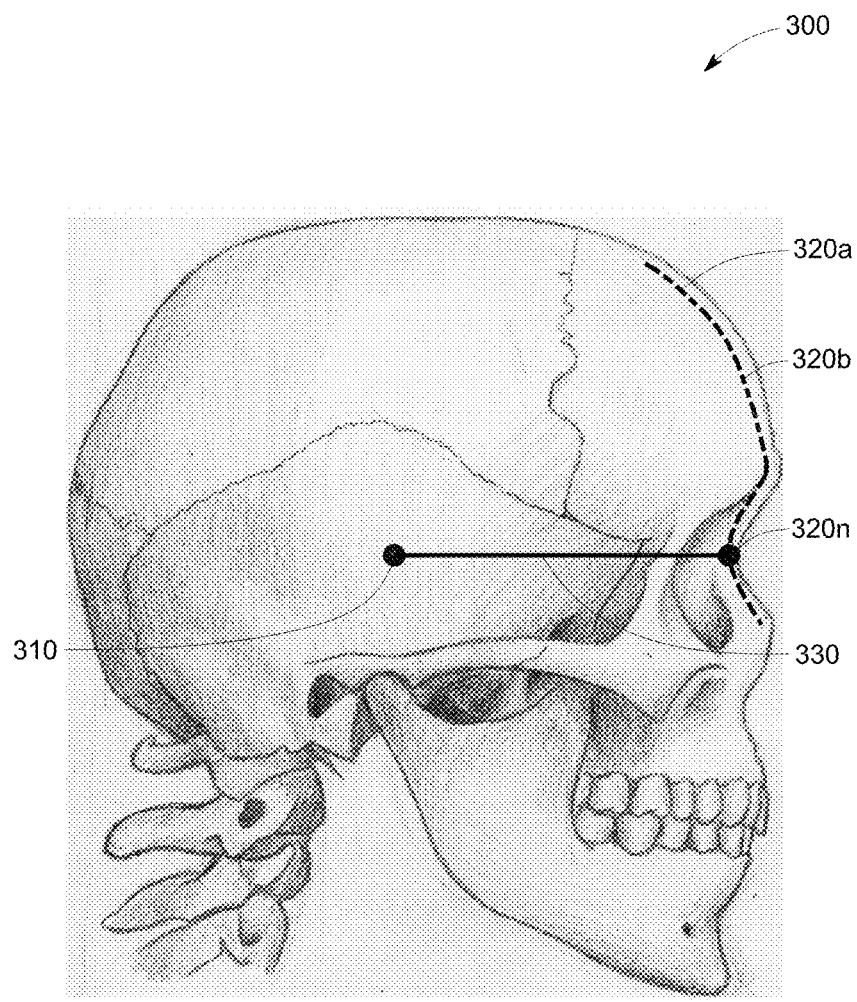
FIG. 3 is a CT image including a nasion of a head according to one embodiment.

The nasion detector 155 is further configured to send the location of the petrous bone centroid and the locations of the nasion of the head in the CT image to the plane unit 160. Referring now to FIG. 3, a CT image 300 including a nasion of a head is illustrated according to one embodiment. The CT image 300 includes a plurality of voxels 320a, 320b, and 320n that represent points on the surface of the head. In the illustrated embodiment, the nasion detector calculates a plurality of distances between the petrous bone centroid 310 on the mid-saggital plane and the plurality of voxels 320a, 320b, and 320n representing the surface of the head. The nasion detector determines the voxel 320n as the nasion (i.e., the first point of depression) since the distance (i.e., represented by the line 330) between the voxel 320n and the petrous bone centroid 310 is the least amongst the plurality of distances.

Referring back to FIG. 1, the plane unit 160 includes codes and routines configured to generate a reference plane of the head in the CT image. In one embodiment, the plane unit 160 includes a set of instructions executable by the processor 180 to provide the functionality for determining a first and a second porion and generating a reference plane of the head. In another embodiment, the plane unit 160 is stored in the memory 190 and is accessible and executable by the processor 180. In either embodiment, the plane unit 160 is adapted for communication and cooperation with the processor 180 and other sub-units of the reference plane generator 140.

The plane unit 160 receives the locations of the first and the second petrous bones and the one or more directional vectors from the petrous detector 150. The plane unit 160 also receives the petrous bone centroid and the location of the nasion from the nasion detector 155. The plane unit 160 is configured to generate a reference plane connecting the locations of the first and the second petrous bones and the nasion of the head. In a further embodiment, the plane unit 160 is configured to generate a Montague's reference plane connecting the nasion and the first and the second porion of the head. A porion is the superior surface of the external auditory meatus of the head. The plane unit 160 determines the first and the second porions based on the first and the second petrous bones respectively and the nasion. In one embodiment, the plane unit 160 modifies the superior direction vector based on the location of the nasion. The modified superior direction vector represents a direction that is perpendicular to a plane formed by a vector joining the petrous bone centroid to the nasion and a line joining the petrous bones. The plane unit 160 then determines the first porion as the first point depression on the surface of the head, along the modified superior direction vector around the location of the first petrous bone. Similarly, the plane unit 160 determines the second porion as the first point depression on the surface of the head along the modified superior direction vector around the location of the second petrous bone. The plane unit 160 then generates the reference plane, i.e., the Montague's reference plane based on the locations of the first porion, the second porion, and the nasion of the head in the received CT image.

The plane unit 160 is further configured to generate graphical data for providing a user interface including the reference plane on the received CT image to, for example, an operator of the system controller 130. In one embodiment, the plane unit 160 sends the graphical data to a display device (not shown) coupled to the system controller 130. In such an embodiment, the display device (not shown) renders the graphical data and displays the user interface. In another embodiment, plane unit 160 sends the reference plane and the locations of the nasion, the first and the second petrous bone and/or the first and the second porion to an operator of the system controller 130 via, for example, e-mail, short messaging service, a voice message, and the like.

The plane unit 160 may also be configured to construct a personalized atlas of the head in the received CT image based on the reference plane. The personalized atlas is advantageous as the semantic information provided by the personalized atlas about any voxel at any location or any anatomical structure of the head in the received CT image is more accurate than semantic information obtained by comparing the received CT image to a pre-defined atlas generated based on a-priori data. Furthermore, since the petrous bones are the most invariant and precisely detectable structures in the head of a human subject, the reference plane and hence the personalized atlas generated based on the petrous bones are highly reliable and robust to variations caused by time, different subjects, different types of CT scanners 110, and asymmetric positioning of the subject in the CT scanner 110.

Figure 4:
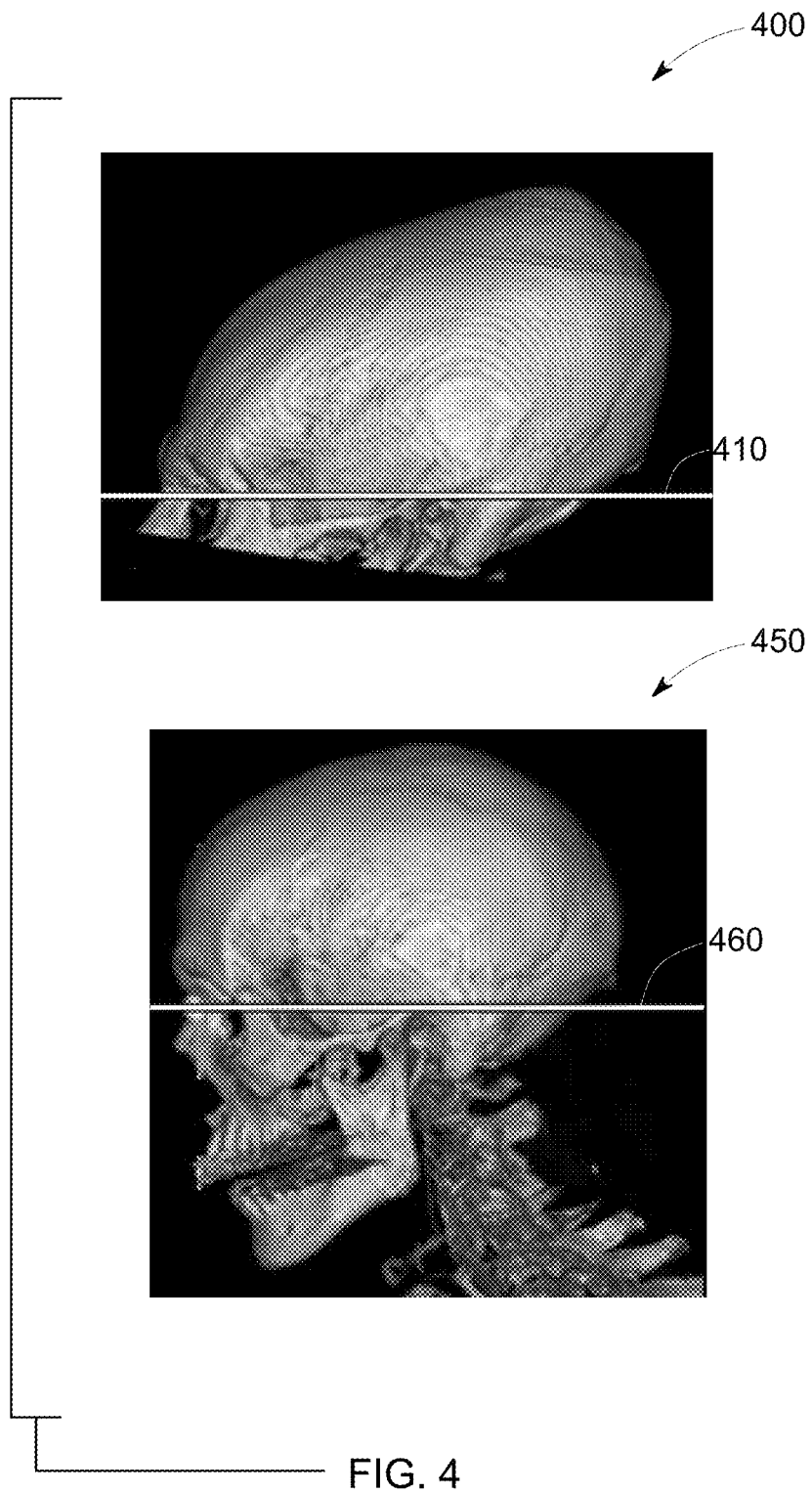
FIG. 4 is a graphical representation illustrating CT images including reference planes of heads according to one embodiment.

Referring now to FIG. 4, illustrates a graphical representation of CT images 400, 450 including reference planes according to one embodiment. The system controller receives CT images 400, 450 comprising heads of two different subjects from the CT scanner. The plane unit of the reference plane generator generates Montague's reference planes 410, 460 that join the nasion, the left porion, and the right porion of the heads in the received CT images 400, 450 respectively.

Figure 5:
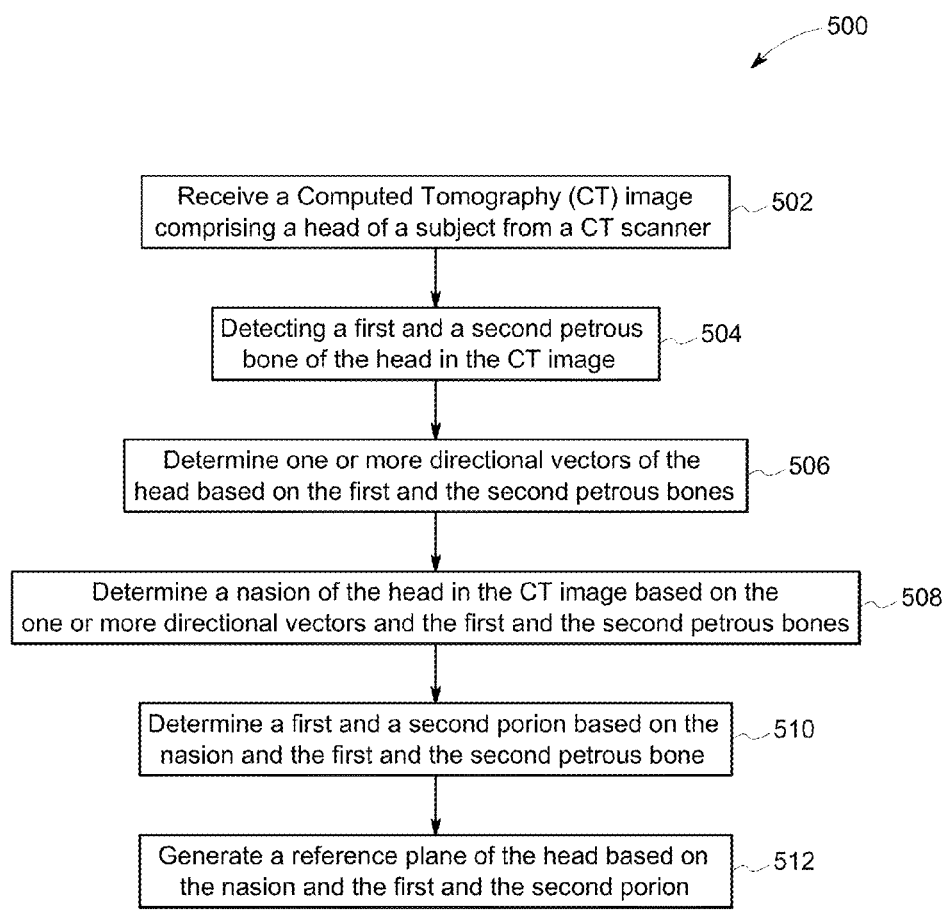
FIG. 5 is a flow diagram illustrating a method for generating a reference plane of a head in a CT image according to one embodiment.

FIG. 5 is a flow diagram illustrating a method 500 for generating a reference plane (i.e., a Montague's reference plane) of a head in a CT image according to one embodiment. The communication unit receives a CT image comprising a head of a subject from a CT scanner 502. The petrous detector detects a first and a second petrous bone of the head in the CT image 504. For example, the petrous detector determines the first and the second petrous bones based on the attenuation values of each voxel in the received CT image. The petrous detector further determines one or more directional vectors of the head based on the first and the second petrous bones 506. For example, the petrous detector determines an anterior direction vector, a posterior direction vector, and a superior direction vector based on the first and the second petrous bones. The nasion detector determines a nasion of the head in the CT image based on the one or more directional vectors and the first and the second petrous bones 508. The plane unit determines a first and a second porion based on the nasion and the first and the second petrous bone 510. The plane unit further generates the Montague's reference plane based on the nasion and the first and the second porion 512. Although FIG. 5 describes a method for generating a Montague's reference plane according to one embodiment, in another embodiment, the system controller may generate a reference plane of the head that connects the nasion and the first and the second petrous bones.

It is to be understood that not necessarily all such objects or advantages described above may be achieved in accordance with any particular implementation. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the technology has been described in detail in connection with only a limited number of implementations, it should be readily understood that the invention is not limited to such disclosed implementations. Rather, the technology can be modified to incorporate any number of variations, alterations, substitutions or equivalent arrangements not heretofore described, but which are commensurate with the spirit and scope of the disclosure. Additionally, while various implementations of the technology have been described, it is to be understood that aspects of the technology may include only some of the described implementations. Accordingly, the inventions are not to be seen as limited by the foregoing description, but are only limited by the scope of the appended claims.

The invention claimed is:

1. A method for generating a reference plane of ahead in a Computed Tomography (CT) image, the method comprising:
   receiving the CT image comprising the head of a subject from a CT scanner;
   detecting a first and a second petrous bone of the head in the CT image;
   determining a nasion of the head in the CT image based on the first and the second petrous bone; and
   generating the reference plane of the head based on the nasion and the first and the second petrous bone.

2. The method of claim 1, wherein detecting the first and the second petrous bone further comprises:
   determining whether an attenuation value of one or more voxels in the CT image exceeds a petrous threshold value; and
   detecting the one or more voxels as the first and the second petrous bone in response to determining that the attenuation value of the one or more voxels exceeds the petrous threshold value.

3. The method of claim 2, further comprising detecting the one or more voxels as the first and the second petrous bone based on positional information of the one or more voxels in the CT image.

4. The method of claim 1, further comprising:
   mapping the first and the second petrous bone based on a first and a second ellipsoid; and
   determining one or more directional vectors of the head based on the first and the second ellipsoid.

5. The method of claim 4, further comprising:
   calculating a petrous bone centroid based on the first and the second petrous bone;
   determining a dominant vector of the first and the second petrous bone based on the one or more direction vectors; and
   identifying a mid-saggital plane of the head based on the petrous bone centroid and the dominant vector.

6. The method of claim 5, wherein determining the nasion further comprises determining a first point of depression on a surface of the head based on the petrous bone centroid and the mid-saggital plane.

7. A system for generating a reference plane of a head in a Computed Tomography (CT) image, the system comprising:
   at least one processor;
   a petrous detector stored in a memory and executable by the at least one processor, the petrous detector configured to receive the CT image comprising a head of a subject from a CT scanner and detect a first and a second petrous bone of the head in the CT image;
   a nasion detector stored in the memory and executable by the at least one processor, the nasion detector communicatively coupled with the petrous detector and configured to determine a nasion of the head in the CT image based on the first and the second petrous bone; and
   a plane unit stored in the memory and executable by the at least one processor, the plane unit communicatively coupled with the nasion detector and configured to generate the reference plane of the head based on the nasion and the first and the second petrous bone.

8. The system of claim 7, wherein the petrous detector is further configured to determine whether an attenuation value of one or more voxels in the CT image exceeds a petrous threshold value and detect the one or more voxels as the first and the second petrous bone in response to determining that the attenuation value of the one or more voxels exceeds the petrous threshold value.

9. The system of claim 8, wherein the petrous detector is further configured to detect the one or more voxels as the first and the second petrous bone based on positional information of the one or more voxels in the CT image.

10. The system of claim 7, wherein the petrous detector is further configured to map the first and the second petrous bone based on a first and a second ellipsoid and determine one or more directional vectors of the head based on the first and the second ellipsoid.

11. The system of claim 10, wherein the nasion detector is further configured to calculate a petrous bone centroid based on the first and the second petrous bone, determine a dominant vector of the first and the second petrous bone based on the one or more direction vectors, and identify a mid-saggital plane of the head based on the petrous bone centroid and the dominant vector.

12. The system of claim 11, wherein the nasion detector determines a first point of depression on a surface of the head based on the petrous bone centroid and the mid-saggital plane.

* * * * *